United States Patent [19]
Lockett et al.

[11] Patent Number: 5,100,448
[45] Date of Patent: Mar. 31, 1992

[54] VARIABLE DENSITY STRUCTURED PACKING CRYOGENIC DISTILLATION SYSTEM

[75] Inventors: Michael J. Lockett; Richard A. Victor, both of Grand Island; Robert Zawierucha, East Aurora; Kenneth McIlroy, Williamsville; Scott L. Cooper, Buffalo, all of N.Y.

[73] Assignee: Union Carbide Industrial Gases Technology Corporation, Danbury, Conn.

[21] Appl. No.: 555,039

[22] Filed: Jul. 20, 1990

[51] Int. Cl.$^5$ ............................................. F25J 3/02
[52] U.S. Cl. .................................... 62/24; 62/32; 62/36; 261/94
[58] Field of Search .............. 261/94; 62/24, 32, 36

[56] References Cited

U.S. PATENT DOCUMENTS

| | | | |
|---|---|---|---|
| 2,047,444 | 7/1936 | Stedman | 261/94 |
| 2,271,671 | 2/1942 | Wible | 261/94 |
| 2,861,432 | 11/1958 | Haselden | 62/29 |
| 2,885,195 | 5/1959 | Haselden | 261/112 |
| 2,998,234 | 8/1961 | Haselden | 261/113 |
| 4,002,705 | 1/1977 | McKeown | 261/DIG. 72 |
| 4,186,159 | 1/1980 | Huber | 261/112 |
| 4,296,050 | 10/1981 | Meier | 261/112 |
| 4,333,894 | 6/1982 | Hoppe et al. | 261/96 |
| 4,813,988 | 3/1989 | Bennett et al. | 62/18 |
| 4,836,836 | 6/1989 | Bennett et al. | 62/22 |
| 4,838,913 | 6/1989 | Victor et al. | 62/22 |
| 4,871,382 | 10/1989 | Thorogood et al. | 62/18 |
| 4,929,399 | 5/1990 | Lockett et al. | 261/122.2 |

FOREIGN PATENT DOCUMENTS

| | | |
|---|---|---|
| 1053469 | 3/1959 | Fed. Rep. of Germany. |
| 8706329 | 10/1987 | PCT Int'l Appl. . |
| 882680 | 11/1961 | United Kingdom . |

OTHER PUBLICATIONS

Ellis et al., A High Efficiency, Low Pressure Drop Distillation Packing, Trans. Instn. Chem Engrs., vol. 41, May 1993, pp. 212–216.
McClain, Vacuum Tower Revamp Increases Gas Oil Draw and Quality, Chemical Processing, Sep. 1985, pp. 82–83.
The Chemical Engineer Supplement, Sep. 1987, p. 11.
Weedman et al., "Rectification of Liquid Air in a Packed Column", J. Ind. and Eng. Chem., 39 p. 732, (Jun. 1947).
Chen, "Packed Column Internals", Chem. Eng. p. 40, (May 1984).
Alekseev, "Pack Columns for Air Rectification: Advantages of Regular Shaped Packing", IIR-Commisim A3, Brighton, England, p. 17 (Sep. 1983).
Aston, "Liquid Air Fractionation:", Ind. and Eng. Chem. 39, p. 718, (May 1947).
Zel'venskii, "Rectification of Argon in Columns with Regular Roll Packing", Kislorodnaya promysnlenost, Aug. 1978, 5, pp. 1–4.
Alekseev, "Operating Characteristics of Rectifying Columns with Regular Crimped Packing", Uses. Konf. Teor. Prakt. Reckt., p. 127.
Alekseev, "How Mesh Packings Can Be Used in the Rectification Towers of Air Separation Plants", Khim. Neft. Mash., 9, pp. 18–19 (Nov. 1966).
Alekseev, "Film Fractionation of Air in Apparatus with a Regular Crimped Packing", Khim. Neft. Mash., 12, pp. 11–12, (Dec. 1974).
Alekseev, "Column with Stacked Packing for Film Fractionation of Air", Chem. & Petr. Eng., p. 438, (Mar. 1971).
Sperandio et al., "A New Type of Packing for Vacuum Rectification", Chemie-Ing-Techn. 37, pp. 323–328, (Aug. 1965).

*Primary Examiner*—Ronald C. Capossela
*Attorney, Agent, or Firm*—Stanley Ktorides

[57] ABSTRACT

A cryogenic distillation system employing a multisection column wherein structure packing of different packing density is employed in at least two sections of the column.

30 Claims, 3 Drawing Sheets

VARIABLE DENSITY STRUCTURED PACKING CRYOGENIC DISTILLATION SYSTEM

TECHNICAL FIELD

This invention relates to the cryogenic separation of air using one or more distillation columns wherein at least one of the columns employs structured packing as column internals.

BACKGROUND OF THE INVENTION

Distillation of a fluid mixture, e.g. air, into two or more portions enriched in a respective mixture component, has generally been carried out employing one or more distillation columns which employ trays or random packing as the column internals or mass transfer elements.

Recently there has developed an increasing use of structured packing as mass transfer elements in distillation columns because structured packing has a lower pressure drop than trays and has more predictable performance than random packing.

However, in a column having more than one section, especially where the hydraulic loads in one section are substantially different from the hydraulic loads in another section, there is a problem because the hydraulic load variations cause one or more sections to be much closer to flooding than other sections. This imposes a severe operating limitation on the columns and significantly reduces the degree of product flowrate variation that can be achieved without risking flooding or other malperformance. While the problem may be addressed by changing the column internal diameter in each section, such a solution is quite costly.

Accordingly it is an object of this invention to provide a method and apparatus for the cryogenic separation of air comprising a column which uses structured packing column internals and has improved operating flexibility over known systems.

SUMMARY OF THE INVENTION

The above and other objects which will become apparent to one skilled in the art upon a reading of this disclosure are attained by the present invention one aspect of which is:

An air separation plant comprising at least one column and having means to pass feed air into the plant and to pass product out of the plant, at least one of said column(s) having a plurality of column sections and having mass transfer elements comprising structured packing in at least two column sections wherein the packing density of structured packing in a first section of said column differs from the packing density of structured packing in a second section of said column.

Another aspect of the invention is:

A method for separating a mixture comprising at least two components having different volatilities, wherein one of said components is oxygen, into a first portion richer in a first component having a higher volatility than that of a second component, and into a second portion richer in the second component, said method comprising introducing the mixture into a column having a plurality of column sections and having mass transfer elements comprising structured packing in at least two column sections, wherein the packing density of structured packing in a first section of the column differs from the packing density of structured packing in a second section of the column, and removing from the column at least some of the first portion and at least some of the second portion.

The term "column" as used herein means a distillation or fractionation column or zone, i.e., a contacting column or zone wherein liquid and vapor phases are countercurrently contacted to effect separation of a fluid mixture, as for example, by contacting of the vapor and liquid phases on packing elements or on a series of vertically spaced trays or plates mounted within the column. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13-3 *The Continuous Distillation Process.* The term, double column is used herein to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

As used herein, the term "argon column" means a column wherein upflowing vapor becomes progressively enriched in argon by countercurrent flow against descending liquid and an argon product is withdrawn from the column.

As used herein, the term "HETP" means the height of packing over which a composition change is achieved which is equivalent to the composition change achieved by a theoretical plate.

As used herein, the term "theoretical plate" means a contact process between vapor and liquid such that the exiting vapor and liquid streams are in equilibrium.

As used herein, the term "structured packing" means packing wherein individual members have specific orientation relative to each other and to the column axis. Examples of structured packing include Stedman packing, described in U.S. Pat. No. 2,047,444, Goodloe Packing, described in Ellis et al, Trans. Instn. Chem. Engrs., 41, 1963, and more recently developed structured packing such as disclosed in U.S. Pat. No. 4,186,159—Huber, U.S. Pat. No. 4,296,050—Meier, and U.S. Pat. No. 4,929,399—Lockett et al.

As used herein, the term "column section" means a zone in the column filling the column diameter. The top or bottom of a particular zone ends when vapor or liquid is removed from or enters the column.

As used herein, the term "packing density" means the surface area available for mass transfer per unit volume of packing.

As used herein, the term "percentage flood at the normal design point" means the hydraulic load for the vapor at the design point, i.e. at the normal operating conditions, times 100, divided by the hydraulic load for the vapor at the flood point, i.e. where the column floods and above which column operation is not possible.

As used herein, the term "different packing density" means a packing density which differs from a reference packing density by at least 50 square meters per cubic meter.

As used herein, the term "the turndown limit" means the hydraulic load for the vapor below which a noticeable deterioration in separation efficiency occurs times 100 divided by the hydraulic load for the vapor at the design point.

DETAILED DESCRIPTION

The invention will be described in detail with reference to the Drawings.

Figure 1:
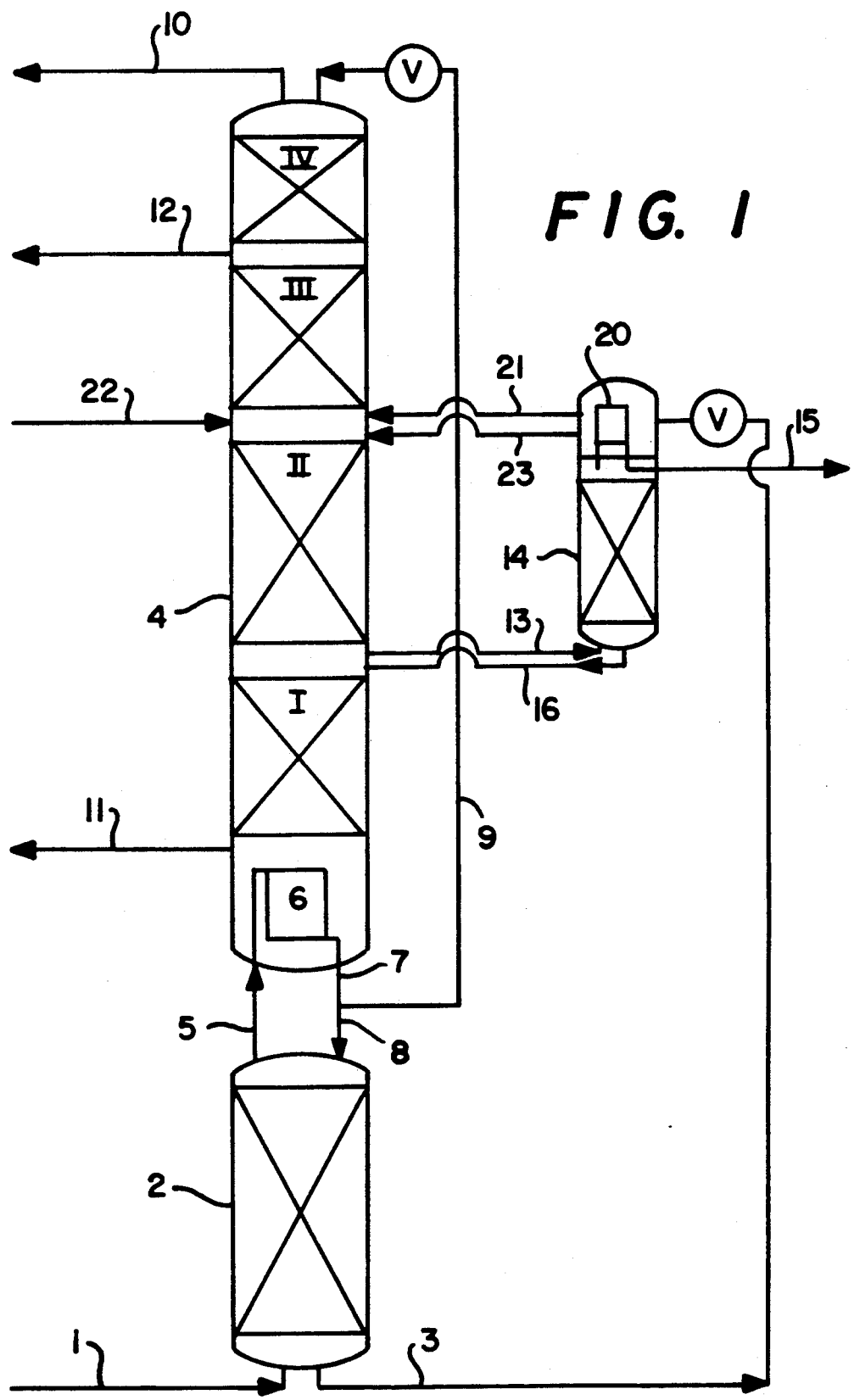
FIG. 1 is a simplified schematic representation of one embodiment of the air separation plant of this invention comprising a double column arrangement having a lower pressure column in heat exchange relationship with a higher pressure column and also having an argon column, wherein the lower pressure column has four column sections and structured packing of different density in at least two of the sections.

Referring now to FIG. 1 higher pressure feed air 1 is introduced into column 2 which is the higher pressure column of a double column system. Within column 2 the feed air is separated by cryogenic distillation into a nitrogen-enriched vapor and an oxygen-enriched liquid. Oxygen-enriched liquid 3 is passed from column 2 into argon column top condenser 20 wherein it is at least partially vaporized against condensing argon column top vapor, and then passed as vapor stream 21 and liquid stream 23 into column 4 which is the lower pressure column of the double column system. Nitrogen-enriched vapor 5 is passed into condenser 6 wherein it is condensed by heat exchange with boiling column 4 bottoms. Resulting nitrogen-enriched liquid 7 is passed in part 8 into column 2 as liquid reflux and in part 9 into column 4 as liquid reflux. Lower pressure feed air 22 may also be introduced into column 4. Within column 4 the feeds are separated by cryogenic distillation into nitrogen-rich and oxygen-rich portions.

Nitrogen-rich portion is removed from column 4 as stream 10 and is recovered as product nitrogen. Oxygen-rich portion is removed from column 4 as stream 11 and is recovered as product oxygen. A waste stream 12 is removed from column 4 for control purposes. A stream 13 comprising primarily oxygen and argon is taken from column 4 at an intermediate point of the column and passed into argon column 14 wherein it is separated by cryogenic distillation into an argon-rich part and an oxygen-rich part. Argon-rich vapor is condensed in argon column top condenser 20 and a portion is removed from column 14 as stream 15 and is recovered as product crude argon. Oxygen-rich part is removed from column 14 and is returned as stream 16 to column 4.

Column 4 has four sections labelled in FIG. 1 as sections I, II, III and IV. Section I is defined by the take off points of streams 11 and 13, section II is defined by the take off point of stream 13 and the introduction point of streams 21 and 23, section III is defined by the introduction point of streams 21 and 23 and the takeoff point of stream 12, and section IV is defined by the takeoff points of streams 12 and 10. In the practice of this invention a column having at least two sections is employed. Generally the maximum number of sections in a column would be about eight.

Because of the introduction and removal of fluid from column 4 and of the changes in the composition of the fluid, the hydraulic load in one section differs significantly from that of another section. Hydraulic load for the vapor may be expressed as $$CV = \frac{M_G}{\rho_G A_T} \left( \frac{\rho_G}{\rho_L - \rho_G} \right)^{0.5}$$

where
$M_G$ = vapor flow rate (lb/s),
$\rho_G$ = vapor density (lb/ft$^3$),
$\rho_L$ = liquid density (lb/ft$^3$),
$A_T$ = cross sectional area (ft$^2$), and
CV = capacity factor (ft/s).

Hydraulic load for the liquid may be expressed as $M_L/(\rho_L A_T)$ where $M_L$ = liquid flow rate (lb/s)

Due to the possibility of widely varying hydraulic load among the column sections an operating limitation is created because the column must be designed to accommodate that section which is most vulnerable to flooding in order to ensure that the column operates so that no section floods. Typically the section most vulnerable to flooding is operated at about 80 percent of flooding at the normal design point and the other section or sections operated at percentages of flooding less than this.

The present invention addresses and solves this problem by employing structured packing of different densities in at least two sections of a column wherein the packing density of structured packing in a first section of the column differs from the packing density of structured packing in a second section of the column. As can be appreciated, the first section of the column may refer to any section of the column. Structured packing having densities within the range of from 250 to 1000 square meters per cubic meter is especially useful in the invention. The structured packing is employed so that the percentage flood at the design point for each section is preferably within 50 to 95 percent. The invention has to do with column rangeability, or load variations. Because of column feeds and draws and composition changes, each column section has different vapor and liquid loading, i.e. hydraulic loads. Using variable density packing one can maintain a given column diameter throughout the column and yet all sections can have acceptable rangeability.

In a preferred embodiment of the invention, the packing density of the structured packing in at least one higher section exceeds the packing density in at least one lower section. In a particularly preferred embodiment of the invention the packing density of the structured packing in the lowermost section is exceeded by the packing density in at least one section above the lowermost section. In another preferred embodiment of the invention the packing density in the lowermost section of the column is less than 700 m$^2$/m$^3$.

The packing density of structured packing within one section may also vary within the scope of this invention.

The invention also addresses and solves another potential problem where oxygen is one of the components to be separated such as in the separation of a mixture comprising oxygen and nitrogen or in the separation of a mixture comprising oxygen and argon. A preferred construction material for structured packing is aluminum because of its lower cost. However, due to the thin cross-section of an individual structured packing element, questions have arisen regarding the flamability of aluminum structured packing in an environment where the oxygen concentration exceeds 21 percent. Accordingly copper has been suggested as a structured packing construction material in such instances (U.S. Pat. No. 4,813,988—Bennett et al). Applicants have found through combustion tests involving packing elements and multiple packing elements that combustion is inhibited if an ignition event occurs at temperature and other process conditions representative of cryogenic distillation columns. Although not wishing to be held to any theory, it is believed that the closely spaced foil elements that comprise a packing element contribute to the combustion inhibition by improving heat dissipation from an ignition event. The aluminum content of the structured packing, i.e. the concentration of aluminum in the material from which the structured packing is made, may be within the range of from 50 to 99.99 percent. Thus with the use of structured packing of variable density and comprised of aluminum, cryogenic air separation can be carried out safely and efficiently, with improved column rangeability, and with reduced overall costs.

The following example is presented for illustrative purposes and is not intended to be limiting.

EXAMPLE

An air separation plant similar to that illustrated in FIG. 1 was operated so as to produce 190 tons per day of oxygen at the design point. The plant employed aluminum structured packing in the lower pressure column of the double column arrangement.

Figure 4:
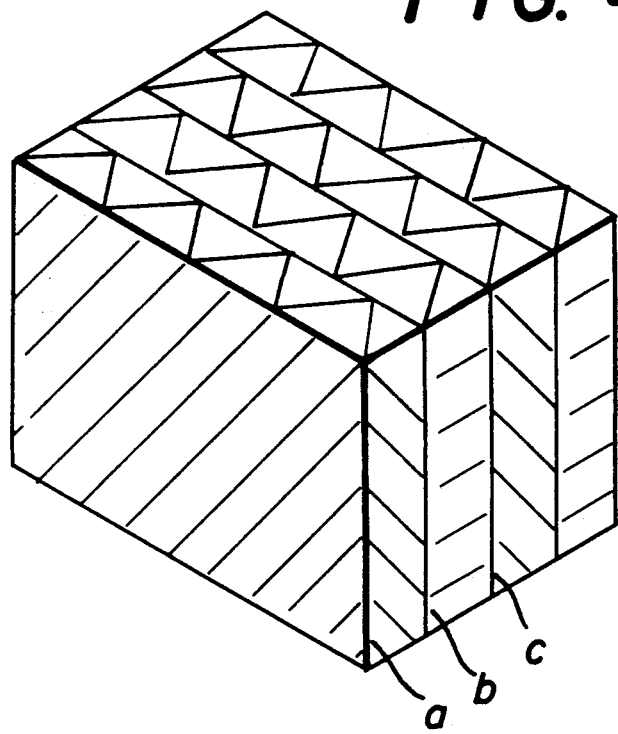
FIG. 4 is a simplified illustration of structured packing having a given packing density such as, for example, 500 square meters per cubic meter, wherein a, b, and c refer to separate packing elements.
Figure 5:
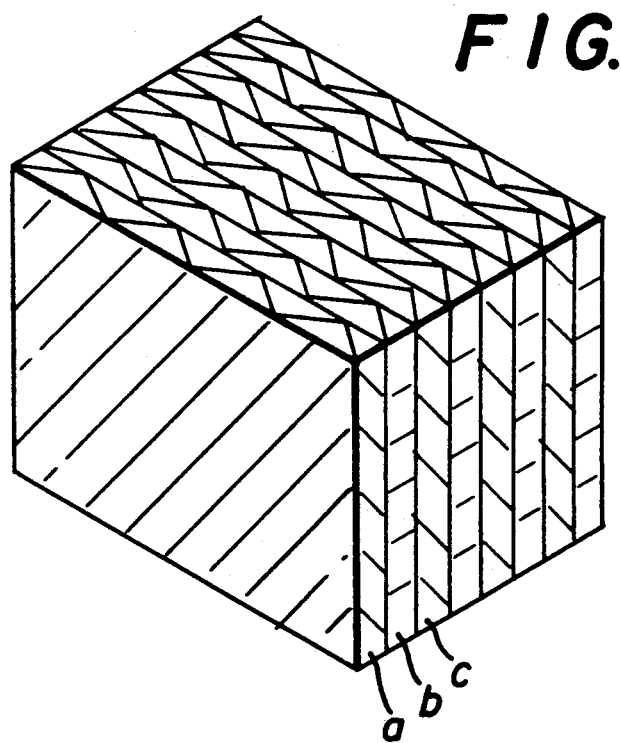
FIG. 5 is a simplified illustration of structured packing having a greater packing density than the given packing density of the structured packing illustrated in FIG. 4, wherein a, b, and c refer to separate packing elements.

The packing in section I of the column had a given density such as is illustrated in FIG. 4 and the packing in section II had a density greater than that of the packing in section I such as is illustrated in FIG. 5. In this case the packing in section I had a density of 500 $m^2/m^3$ and the packing section II had a density of 700 $m^2/m^3$. The packing in section III had a density of 350 $m^2/m^3$, and the packing in section IV had a density of 500 $m^2/m^3$. The column had an internal diameter of 52.5 inches in all sections.

Figure 2:
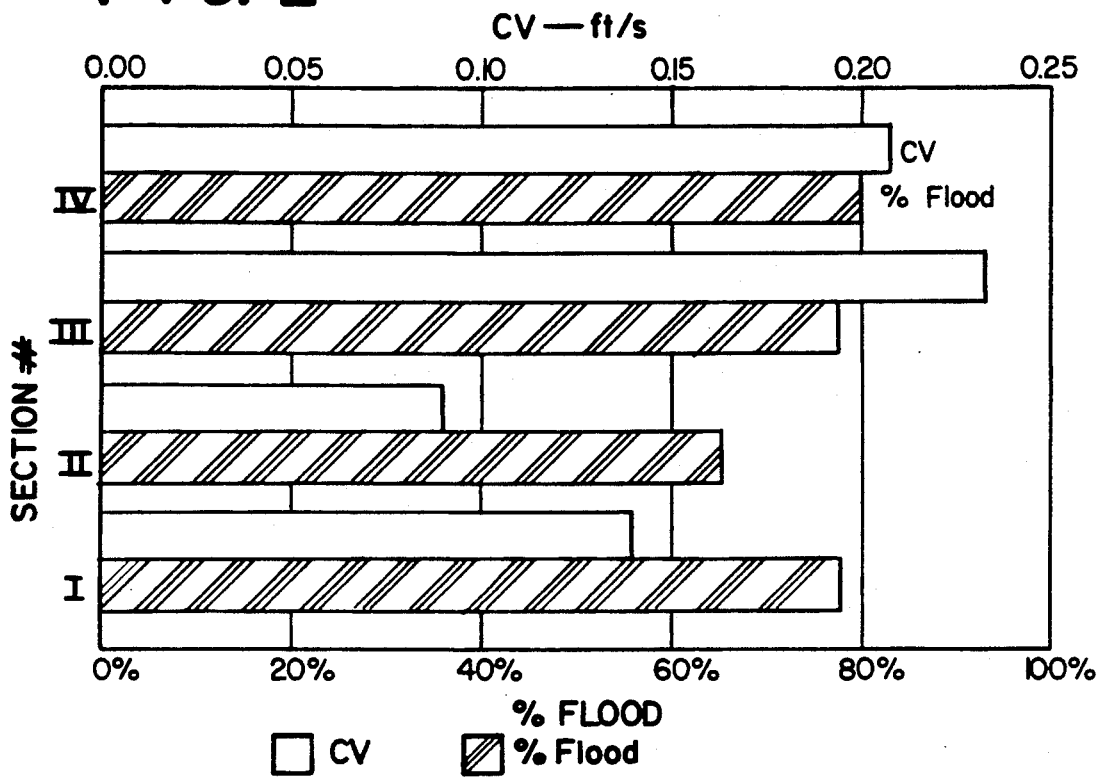
FIG. 2 is a graphical representation of the percent flood at the normal design point and the hydraulic load for the vapor for each of the four sections of the column illustrated in FIG. 1.

FIG. 2 is a graphical representation of the percentage flood at the design point and the capacity factor in each section. As can be seen the percentage flood in each section is within the range of 65 to 80 percent while the capacity factor in all sections exceeds 0.06 ft/sec, below which an unacceptably high HETP (height equivalent to a theoretical plate) occurs. Moreover the plant can operate successfully with a turndown limit as low as 67 percent.

In U.S. Pat. No. 4,836,836—Bennett et al there is discussed the HETP values which are necessary when separating argon and oxygen. Section I of the upper column of the embodiment of this invention illustrated in FIG. 1 is used to separate a mixture containing argon and oxygen and, because the separation is difficult, a large number of theoretical stages are needed in section I. Bennett et al teach that if the packing HETP is in the range 7.6 to 8.2 inches then the use of packing will incur a large capital penalty compared with the use of trays. The reason for this is that the HETP for trays is lower than 7.6–8.2 inches. Bennett et al further teach that at HETP's of approximately 7.0 inches no capital penalty is incurred compared with trays and thus the use of structured packing having an HETP substantially lower than 7.6 to 8.2 inches is necessary for packing to be economic in section I on a capital cost basis. It follows then from the prior art that for choosing an appropriate packing density for section 1 one should choose it such that the HETP is significantly lower than 7.6 to 8.2 inches. By experiment, in a 12 inch diameter laboratory column, the applicants have found that for the separation of oxygen-argon mixtures by cryogenic distillation, the HETP using structured packing having a density of 500 $m^2/m^3$ is in the range of from 7.4 to 8.0 inches and for structured packing having a density of 700 $m^2/m^3$ the HETP is in the range from 5.6 to 6.3 inches. Given the generally accepted 15 percent increase in HETP due to fluid maldistribution when translating laboratory data to the operation of full scale columns, this results in the teaching that packing having a density of at least 700 $m^2/m^3$ would be needed in section I.

For many types of structured packing, HETP increases rapidly below some minimum value of CV. U.S. Pat. No. 4,836,836 shows a typical example where HETP rises rapidly when CV falls below about 0.06 ft/s. The reason for the fall-off in separating efficiency below a critical minimum value of CV is not clear. It could be due to reduced vapor turbulence which in turn reduces mass transfer coefficients or there may be some other explanation. Nevertheless, it is necessary to maintain the CV value above a minimum value of about 0.06 ft/s to avoid undue risk of malperformance. Now an air separation plant has to operate not only at its design point but also under turndown conditions. In the practice of this invention, as summarized in FIG. 2, wherein structured packing of different density is employed in different column sections, and, in particular, where packing having a density of 500 $m^2/m^3$ is employed in section I and packing having a higher density is employed in at least one higher section, performance is improved. Because of the higher hydraulic capacity of the lower density packing in section I, the column diameter is set by section IV. CV in section II at the design point if 0.09 ft/s. Turndown is limited by section II but the turndown limit is 0.06/0.09 × 100% = 67% of the normal design point. This is an acceptable value because it matches the normal turndown range of the rest of the plant components.

Figure 3:
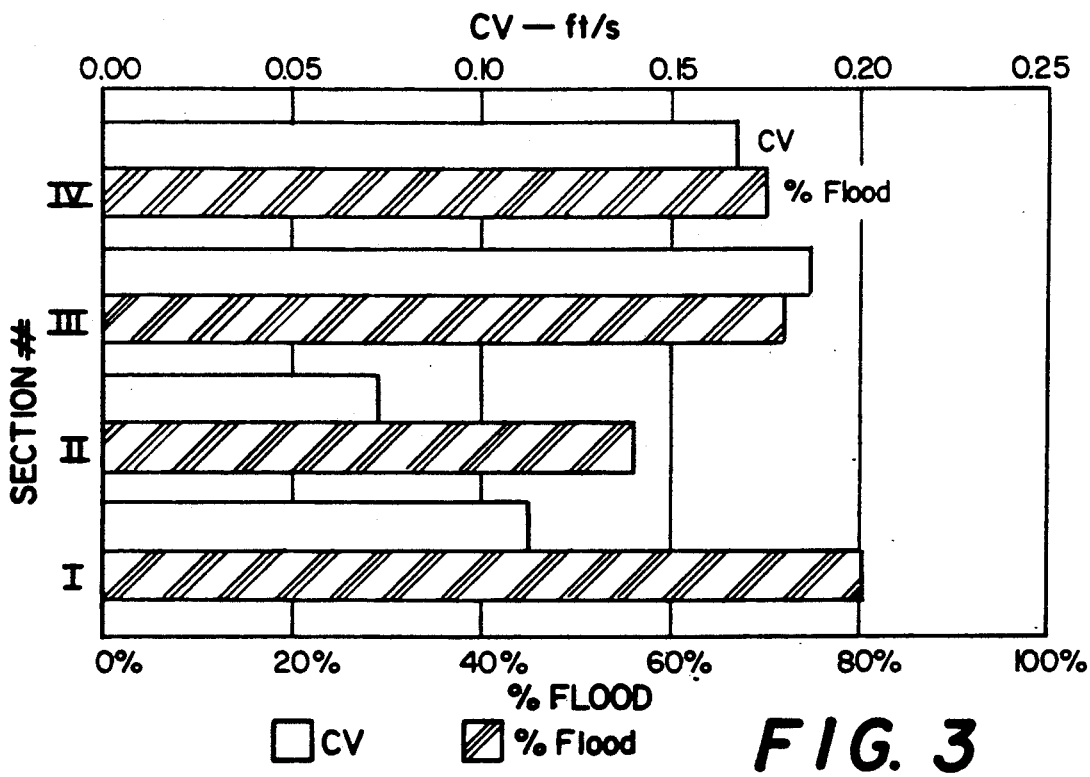
FIG. 3 is a graphical representation of the percent flood at the normal design point and the hydraulic load for the vapor for each of four sections of a column.

If the operation of the plant illustrated in FIG. 1 were operated using packing having a density of 700 $m^2/m^3$ in section I, the calculated results are graphically illustrated in FIG. 3. Column capacity is now limited by section I and to maintain 80% flood at the design point, the column diameter must be increased to 58.5 inches. Because of the increased diameter, CV at the design point falls to 0.07 ft/sec in section II. Section II still limits the turndown but now the turndown limit is 0.06/0.07 × 100% = 86% of the normal design load because of the danger of excessively high HETP's in section II when CV falls below 0.06 ft/s. Turndown to only 86% severely limits plant rangeability.

Thus the present invention comprises an advantageous deployment of different packing densities in the different sections of a column. The selection of the packing density in each section is determined taking into account the interrelationships between flooding, turndown, HETP and column diameter. Increased rangeability is achieved using structured packing having a lower density in the lowermost section than is suggested by the prior art.

Although the invention has been described in detail with reference to certain embodiments, those skilled in the art will recognize that there are other embodiments within the spirit and scope of the claims.

We claim:

1. An air separation plant comprising at least one column and having means to pass feed air into the plant and to pass product out of the plant, at least one of said column(s) having a plurality of column sections and having mass transfer elements comprising structured packing in at least two column sections, wherein the packing density of structured packing in a first section of said column differs from the packing density of structured packing in a second section of said column and wherein each of said first and second column sections has an end where vapor or liquid is removed from or enters the column.

2. The air separation plant of claim 1 wherein the internal diameter of the column in each section is the same.

3. The air separation plant of claim 1 wherein the second section is higher than the first section and the packing density of structured packing in the second section is different from and exceeds the packing density of structured packing in the first section.

4. The air separation plant of claim 3 wherein the first section is the lowermost section of the column.

5. The air separation plant of claim 4 wherein the packing density of the lowermost section of the column is less than 700 $m^2/m^3$.

6. The air separation plant of claim 5 wherein the structured packing comprises aluminum.

7. The air separation plant of claim 4 wherein the structured packing comprises aluminum.

8. The air separation plant of claim 1 wherein the packing density of the lowermost section of the column is less than 700 $m^2/m^3$.

9. The air separation plant of claim 8 wherein the structured packing comprises aluminum.

10. The air separation plant of claim 1 wherein the structured packing comprises aluminum.

11. The air separation plant of claim 10 wherein the structured packing comprising aluminum has an aluminum concentration exceeding 50 percent.

12. The air separation plant of claim 1 wherein one section contains structured packing having different packing densities.

13. The air separation plant of claim 1 wherein the column has from 2 to 8 sections.

14. The air separation plant of claim 1 wherein the structured packing has a density within the range of from 250 to 1000 $m^2/m^3$.

15. The air separation plant of claim 1 comprising a plurality of columns.

16. The air separation plant of claim 15 comprising a double column.

17. The air separation plant of claim 16 further comprising an argon column.

18. A method for separating a mixture comprising at least two components having different volatilities, wherein one of said components is oxygen, into a first portion richer in a first component having a higher volatility than that of a second component, and into a second portion richer in the second component, said method comprising introducing the mixture into a column having a plurality of column sections and having mass transfer elements comprising structured packing in at least two column sections, wherein the packing density of structured packing in a first section of the column differs from the packing density of structured packing in a second section of the column, and removing from the column at least some of the first portion and at least some of the second portion, and wherein each of said first and second column sections has an end where vapor or liquid is removed from or enters the column.

19. The method of claim 18 wherein the mixture comprises oxygen and nitrogen.

20. The method of claim 19 wherein the first section is the lowermost section of the column.

21. The method of claim 20 wherein the packing density of the lowermost section of the column less than 700 $m^2/m^3$.

22. The method of claim 21 wherein the structured packing comprises aluminum.

23. The method of claim 20 wherein the structured packing comprises aluminum.

24. The method of claim 18 wherein the mixture comprises oxygen and argon.

25. The method of claim 18 wherein the packing density is selected so that the percentage flood at the normal design point is within the range of from 50 to 95 percent in each section.

26. The method of claim 18 wherein the second section is higher than the first section and the packing density of structured packing in the second section is different from and exceeds the packing density of structured packing in the first section.

27. The method of claim 18 wherein the packing density of the lowermost section of the column is less than 700 $m^2/m^3$.

28. The method of claim 27 wherein the structured packing comprises aluminum.

29. The method of claim 18 wherein the structured packing comprises aluminum.

30. The method of claim 29 wherein the structured packing comprising aluminum has an aluminum concentration exceeding 50 percent.

* * * * *

UNITED STATES PATENT AND TRADEMARK OFFICE
CERTIFICATE OF CORRECTION

PATENT NO. : 5,100,448
DATED : March 31, 1992
INVENTOR(S) : M. J. Lockett, et al.

It is certified that error appears in the above-identified patent and that said Letters Patent is hereby corrected as shown below:

On the Title page, col. 2, line 2
item [56] under References Cited, Other Publications, in the Ellis, et al. reference, delete "1993" and insert therefor --1963--.

On the Title page, item [57],
In the ABSTRACT, line 2, delete "structure" and insert therefor --structured--.

In column 6, line 46 delete "if" and insert therefor --is--.

In column 29, line 29, between "column" and "less" insert --is--.

Signed and Sealed this

Fifteenth Day of June, 1993

Attest:

MICHAEL K. KIRK

*Attesting Officer*   *Acting Commissioner of Patents and Trademarks*